United States Patent [19]
Suzuki et al.

[11] Patent Number: 5,373,119
[45] Date of Patent: Dec. 13, 1994

[54] EXHAUST MUFFLER FOR INTERNAL COMBUSTION ENGINE

[75] Inventors: Kiyoshi Suzuki; Noboru Nagai; Tadashi Ozaki; Isao Masuda, all of Tokyo, Japan

[73] Assignee: Kioritz Corporation, Tokyo, Japan

[21] Appl. No.: 122,799

[22] Filed: Sep. 15, 1993

Related U.S. Application Data

[63] Continuation of Ser. No. 933,886, Aug. 21, 1992, abandoned, which is a continuation of Ser. No. 617,493, Nov. 23, 1990, abandoned.

[51] Int. Cl.⁵ .......................... F01N 3/02; F01N 3/15
[52] U.S. Cl. ................................. 181/230; 181/231; 181/240; 181/243; 181/258; 60/299
[58] Field of Search ............... 181/240, 243, 230, 231, 181/232, 256, 258, 264, 282; 60/299

[56] References Cited

U.S. PATENT DOCUMENTS

| | | |
|---|---|---|
| 3,404,749 | 10/1968 | Miller et al. |
| 3,798,769 | 3/1974 | Bailey . |
| 4,086,063 | 4/1978 | Garcea .......................... 60/299 |
| 4,370,855 | 2/1983 | Tuggle ...................... 181/240 X |
| 4,376,817 | 4/1988 | Harwood .................. 181/282 X |
| 4,418,790 | 12/1983 | Agnew ....................... 181/282 X |
| 4,589,516 | 5/1986 | Inoue et al. ............... 181/282 X |
| 4,790,864 | 12/1988 | Kostun ....................... 181/229 X |
| 4,867,270 | 9/1989 | Wissmann et al. ........ 181/282 X |
| 4,890,690 | 1/1990 | Fisher et al. .............. 181/282 X |
| 5,139,107 | 8/1992 | Nagai ......................... 181/258 X |

Primary Examiner—Michael L. Gellner
Assistant Examiner—Khanh Dang
Attorney, Agent, or Firm—Bauer & Schaffer

[57] ABSTRACT

A muffler for internal combustion engines is formed of vertically separable body sections so that the sound absorbing and filter members may be accessed easily for replacement and/or cleaning.

5 Claims, 3 Drawing Sheets

EXHAUST MUFFLER FOR INTERNAL COMBUSTION ENGINE

This is a continuation of Ser. No. 07/933,886 filed Aug. 21, 1992, abandoned, is a continuation of Ser. No. 07/617,493 filed on Nov. 23, 1990, now abandoned.

FIELD OF THE INVENTION

This invention relates to an exhaust muffler for such internal combustion engine as an air-cooled two-cycle gasoline engine used for such small operating machine as a mower or chain saw.

BACKGROUND OF THE INVENTION

In a two-cycle gasoline engine or the like for such small operating machine as is mentioned above, exhaust gas is delivered to an exhaust muffler out of an exhaust port of a cylinder, is silenced there and is discharged out.

The above mentioned exhaust muffler is provided to silence and clean the exhaust gas. There have been already provided many products in which such sound absorbing member as a porous plate or glass wool is arranged and used within an exhaust muffler to silence the exhaust gas or various catalysts are used to clean the exhaust gas.

There have been defects that, when such sound absorbing member as glass wool or any catalyst is used as mentioned above, specifically in a small two-cycle gasoline engine, carbon and tar produced by the combustion of a lubricating oil mixed with fuel will be deposited further in the exhaust gas path, the weight of the exhaust muffler and the back pressure by the exhaust gas will increase, the interval of the maintenance of the exhaust muffler will become short and the effective life of the exhaust muffler will become very short.

BRIEF SUMMARY OF THE INVENTION

This invention has it as an object to provide an internal combustion engine exhaust muffler wherein the carbon deposition and tar stain can be quickly removed and which is not required to be replaced as a whole, is therefore economical and is high in the efficiency of cleaning the exhaust gas.

For this purpose, in the present invention, an exhaust muffler for internal combustion engines is formed to be dividable and integratable and sound absorbing and cleaning member holding portions are formed respectively in the opposed parts within it.

In the present invention, in case the muffler is continued to be used and the carbon deposition or tar stain on the sound absorbing and cleaning member progresses until the operating condition becomes bad, the exhaust muffler 10 may be divided and only the sound absorbing and cleaning member 13 provided within it may be removed, cleaned or replaced. Therefore, there are advantages that the exhaust muffler need not be replaced as a whole and is economical and that the work of replacing the sound absribing and cleaning member is very easy. Also, as sound absorbing and cleaning member holding portions are formed respectively in the opposed portions within the muffler, it is very easy to hold the above mentioned sound absorbing and cleaning material.

DETAILED DESCRIPTION OF THE INVENTION

Figure 1:
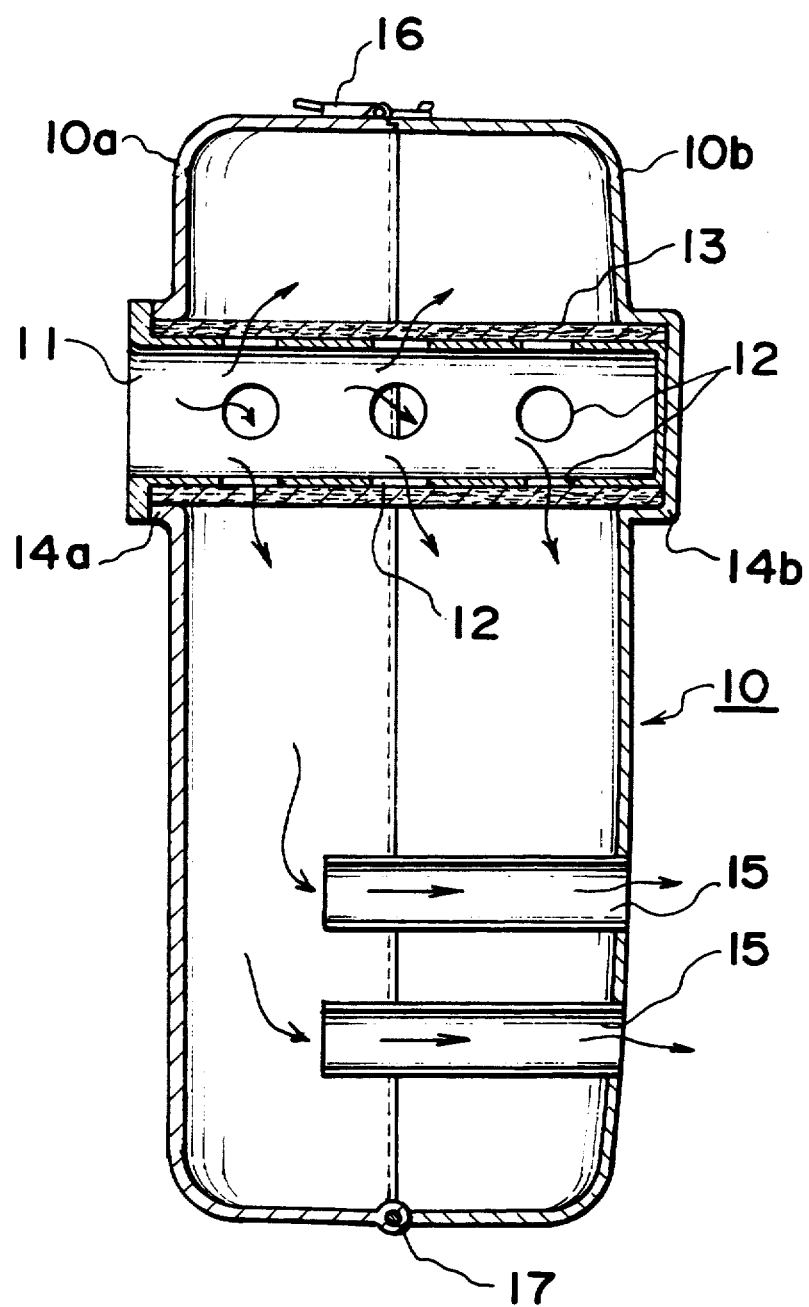
FIG. 1 is a vertically sectioned view of an essential part of an exhaust muffler of an embodiment of the present invention.

The present Invention shall be described in detail in the following on the basis of the embodiments shown in the drawings.

Figure 3:
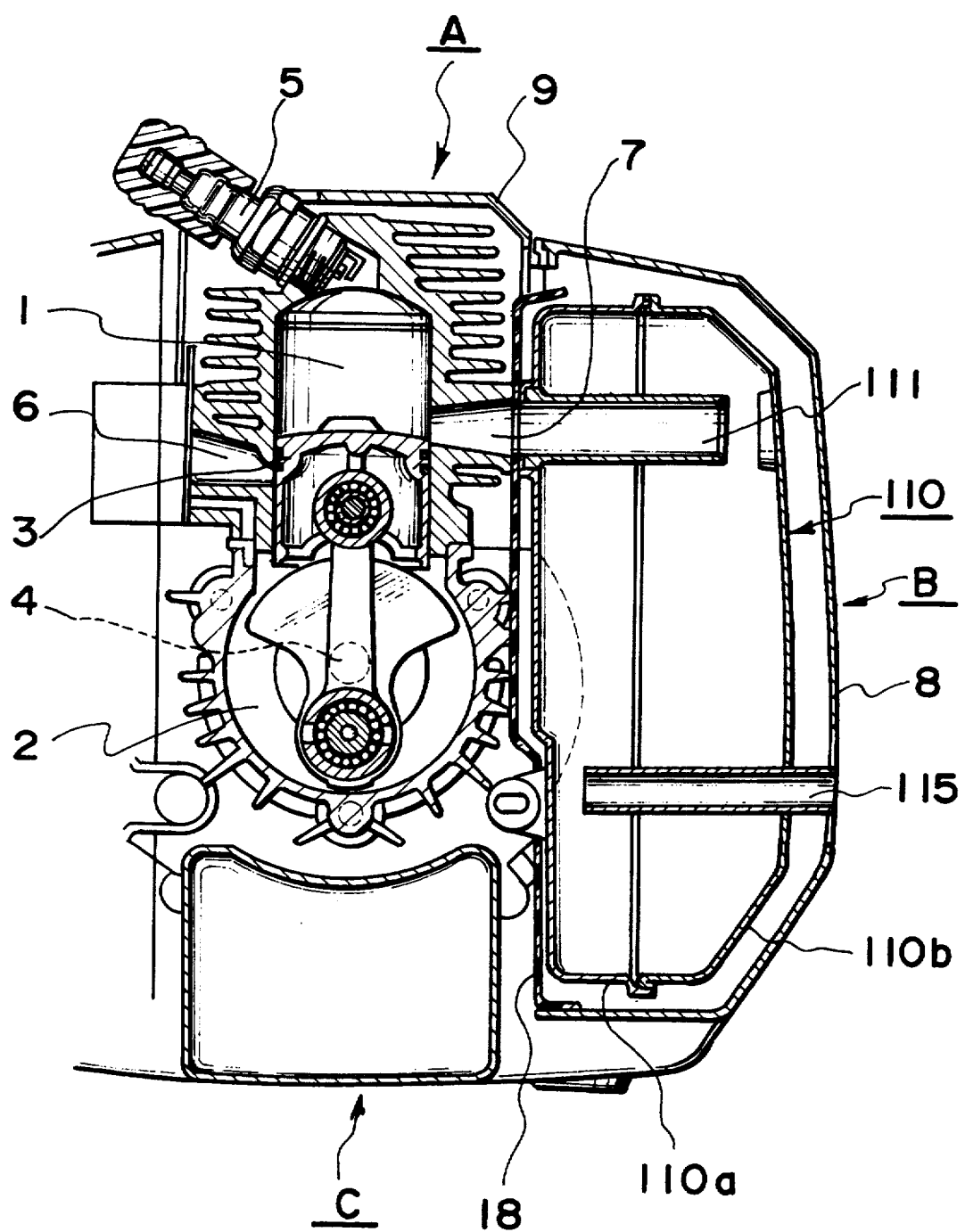
FIG. 3 is a vertically sectioned view of an engine body and exhaust muffler part of a conventional example.

First of all, there shall be described the conventional example shown in FIG. 3 to be compared with the present invention.

In FIG. 3, the reference symbol A represents a body of a two-cycle gasoline engine, B represents an exhaust muffler part and C represents a fuel tank.

Said body part A is formed of a cylinder 1, crankcase 2, piston 3, crankshaft 4, ignition plug 5 and so on. In said cylinder 1 are formed a suction port 6 communicating with a carburetter and air cleaner (not illustrated) and an exhaust port 7 to which is connected an exhaust muffler 110 of said exhaust muffler part B.

Said exhaust muffler 110 has two box-like exhaust muffler pieces 110a and 110b made integral to form a body by being hemmed or welded in the mating portions and has an exhaust gas inlet pipe 111 and outlet pipe 115 arranged within it.

Also, in FIG. 3, the reference numeral 8 represents an exhaust muffler cover removably fixed to the cylinder cover 9 side and provided between said engine body part A and fuel tank C side and said exhaust muffler part B side with a heat insulating plate 18 so that the heat of said exhaust muffler B may not be transmitted to the engine part A and fuel tank C side.

The exhaust muffler 10 of the present invention is to be used in place of the above mentioned exhaust muffler 110, for example, in FIG. 3 and its example is shown in detail in FIG. 1.

In FIG. 1, the reference numeral 10 represents an exhaust muffler of an embodiment of the present invention vertically divided into two parts of an exhaust muffler piece 10a on said engine body part A side and an exhaust muffler piece 10b on said exhaust muffler cover 8 side so as to be dividable and integrally sealable by a latch type locking piece 16 provided at the upper side end and a hinge 17 provided at the lower side end thereof.

In FIG. 1, the reference numeral 11 represents an exhaust gas inlet pipe jointed to the above mentioned exhaust port 7 and provided with many small holes 12 on the peripheral wall so as to communicate with the inside and outside. The reference numeral 13 represents a sound absorbing and cleaning member reinforced with a punched metal plate or metal screen and removably formed like a cylinder having an inside diameter adapted to the entire outer peripheral surface of said exhaust gas inlet pipe 11.

It is preferable to use for said sound absorbing and cleaning member a ceramic cloth woven like a cloth, for example, of silica fibers or alumina fibers having a catalyst layer on the surface.

Further, the above mentioned sound absorbing and cleaning member 13 is fitted and supported at one end in a holding portion 14a formed on the outer periphery of the above mentioned inlet pipe 11 fitting base within the exhaust muffler piece 10a on the above mentioned engine body part A side and is fitted and supported at the other end together with the free end of said inlet pipe 11 in a cylindrical holding portion 14b provided in a position opposed to the above mentioned holding portion 14a within the exhaust muffler piece 10b on the above mentioned exhaust muffler cover 8 side.

In FIG. 1, the reference numeral 15 represents an outlet pipe as a final outlet of the exhaust gas to the outside.

In the present invention of the above mentioned formation, during the operation of the engine, exhaust gas will be continuously delivered to the exhaust gas inlet pipe 11 out of the exhaust port 7 of the cylinder 1, will pass through the small holes 12 made through the peripheral wall of said exhaust gas inlet pipe 11, will be passed through the sound absorbing and cleaning member 13 and then will be discharged out of the outlet pipe 15.

At this time, when the above mentioned exhaust gas is passed through the sound absorbing and cleaning member 13, the exhaust gas will be silenced and cleaned. Then, in case the muffler is continued to be used and the carbon deposition and tar stain on the sound absorbing and cleaning member 13 or within the exhaust muffler 10 progress, the latch type locking piece 16 of the exhaust muffler 10 may be unlocked, the exhaust muffler 10 may be divided into the two exhaust muffler pieces 10a and 10b and the sound absorbing and cleaning member 13 may be replaced or may be cleaned. By the way, an oxidizing catalyst or the like carrying platinum or palladium is contained in the ceramic cloth of said sound absorbing and cleaning member 13. According to the present invention, even though the carbon deposition and tar stain on the sound absorbing and cleaning member B or within the exhaust muffler 10 progress, the exhaust muffler 10 as a whole need not be replaced but only the sound absorbing and cleaning member 13 within it may be removed and replaced.

The other embodiment of the present invention shown in FIG. 2 shall be described in the following.

Figure 2:
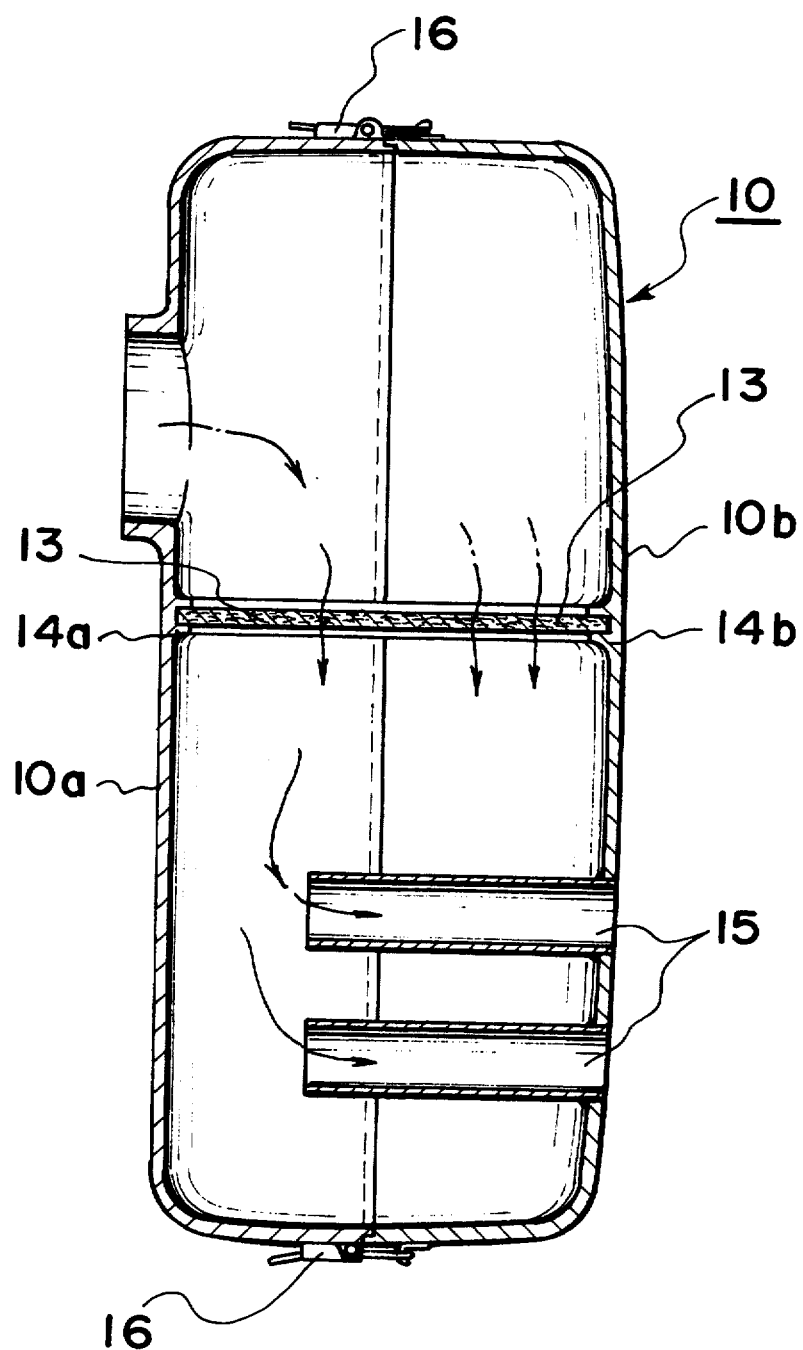
FIG. 2 is a vertically sectioned view of an essential part of an exhaust muffler of another embodiment of the present invention.

In FIG. 2, the same parts as in the embodiment shown in the above mentioned FIG. 1 shall bear the same reference numerals and shall not be explained.

This embodiment is of substantially the same formation as of the embodiment shown in the above mentioned FIG. 1 but there is no exhaust gas inlet pipe 11 in FIG. 1 and the formation of the holding portions 14a and 14b is different. That is to say, the sound absorbing and cleaning member 13 reinforced by the punched metal plate or metal screen is formed to be like a flat plate and recessed groove-like holding portions 14a and 14b for receiving the flat plate-like sound absorbing and cleaning member 13 are provided respectively in the opposed positions within the two divided exhaust muffler pieces 10a and 10b.

Also, the one exhaust muffler piece 10b only can be perfectly removed by unlocking the latch type locking pieces 16 above and below the muffler 10.

As explained above in detail, according to the present invention, there are effects that, in case the muffler is used for a long period, carbon and tar stain are deposited on the sound absorbing and cleaning member and so on within the exhaust muffler and its performance reduces, the exhaust muffler as a whole need not be replaced, that the exhaust muffler is thus economical and that such work as of replacing the sound absorbing and cleaning member is very easy.

What is claimed is:

1. An exhaust muffler for internal combustion engines comprising a body divided along a parting line into two separable cup shape sections, and having an inlet in the bottom wall of one section and an outlet in the bottom wall in the other section said inlet and outlet being axially offset from each other on opposing sides of said parting line, means for detachably securing said sections together, with the wall having said inlet and the wall having said outlet in opposition to each other, a sound absorbing and cleaning member located in said body transversely intersecting the parting line of said two sections and extending between the opposing bottom walls in each of said two opposed sections to complete separate said inlet from said outlet, and means for removably clamping said sound absorbing and cleaning member to the respective ones of said bottom walls so that upon separation of one of said sections from the other said sound absorbing and cleaning member may be easily removed.

2. The muffler according to claim 1, wherein said body sections are hinged at one end and provided with a locking latch at the end opposite thereto.

3. The muffler according to claim 1 wherein said body sections are provided with locking latches at each of the opposed ends thereof.

4. The muffler according to claim 1, wherein said sound absorbing and cleaning member is cylindrical in shape and is arranged to extend through a hole in one section of said body in alignment with the exhaust outlet of the internal combustion engine and to seat within a recess in an inner wall of the other section of said body opposite to the hole.

5. The muffler according to claim 1 wherein said sound absorbing and cleaning member is planar and said body sections are formed with conforming grooves on their interior walls for receiving said sound absorbing and cleaning member.

* * * * *